(12) United States Patent
Fong et al.

(10) Patent No.: US 9,418,464 B2
(45) Date of Patent: *Aug. 16, 2016

(54) CONTROL OF TIMING FOR ANIMATIONS IN DYNAMIC ICONS

(71) Applicant: Microsoft Technology Licensing, LLC, Redmond, WA (US)

(72) Inventors: Jeffrey Cheng-Yao Fong, Seattle, WA (US); Jeffery G. Arnold, Sammamish, WA (US); Christopher A. Glein, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 232 days.

This patent is subject to a terminal disclaimer.

(21) Appl. No.: 14/059,163

(22) Filed: Oct. 21, 2013

(65) Prior Publication Data

US 2014/0098108 A1 Apr. 10, 2014

Related U.S. Application Data

(63) Continuation of application No. 12/721,422, filed on Mar. 10, 2010, now Pat. No. 8,589,815.

(51) Int. Cl.
  *G06F 3/048* (2013.01)
  *G06T 13/00* (2011.01)
  *G06F 3/0481* (2013.01)

(52) U.S. Cl.
  CPC ............ *G06T 13/00* (2013.01); *G06F 3/04817* (2013.01)

(58) Field of Classification Search
  CPC .......................... G06F 3/04817; G06T 13/00
  See application file for complete search history.

(56) References Cited

U.S. PATENT DOCUMENTS

| 5,297,032 | A | 3/1994 | Trojan et al. |
| 5,321,750 | A | 6/1994 | Nadan |
| 5,339,392 | A | 8/1994 | Risberg et al. |
| 5,819,284 | A | 10/1998 | Farber et al. |
| 5,959,621 | A | 9/1999 | Nawaz et al. |
| 6,188,405 | B1 | 2/2001 | Czerwinski et al. |
| 6,216,141 | B1 | 4/2001 | Straub et al. |

(Continued)

FOREIGN PATENT DOCUMENTS

WO WO 99/26127 5/1999
WO WO 2009012398 A1 1/2009

OTHER PUBLICATIONS

Farrugia et al., "Cell Phone Mini Challenge: Node-Link Animation Award Animating multivariate dynamic social networks," *IEEE Symposium on Visual Analytics Science and* Technology, Oct. 2008, pp. 215-216.

(Continued)

*Primary Examiner* — Thanh Vu
(74) *Attorney, Agent, or Firm* — Miia Sula; Judy Yee; Micky Minhas (57) ABSTRACT

Dynamic icons are described that can employ animations, such as visual effects, audio, and other content that change with time. If multiple animations are scheduled to occur simultaneously, the timing of the animations can be controlled so that timing overlap of the animations is reduced. For example, the starting times of the animations can be staggered so that multiple animations are not initiated too close in time. It has been found that too much motion in the user interface can be distracting and cause confusion amongst users.

20 Claims, 11 Drawing Sheets

(56) References Cited

U.S. PATENT DOCUMENTS

| | | |
|---|---|---|
| 6,278,448 B1 | 8/2001 | Brown et al. |
| 6,311,058 B1 | 10/2001 | Wecker et al. |
| 6,449,638 B1 | 9/2002 | Wecker et al. |
| 6,456,334 B1 | 9/2002 | Duhault |
| 6,510,553 B1 | 1/2003 | Hazra |
| 6,724,403 B1 | 4/2004 | Santoro et al. |
| 6,832,355 B1 | 12/2004 | Duperrouzel et al. |
| 6,976,210 B1 | 12/2005 | Silva et al. |
| 7,028,264 B2 | 4/2006 | Santoro et al. |
| 7,376,907 B2 | 5/2008 | Santoro et al. |
| 7,412,663 B2 | 8/2008 | Lindsay |
| 7,933,632 B2 | 4/2011 | Flynt et al. |
| 7,987,431 B2 | 7/2011 | Santoro et al. |
| 2002/0097264 A1* | 7/2002 | Dutta et al. ............. 345/745 |
| 2005/0223069 A1 | 10/2005 | Cooperman |
| 2006/0075360 A1 | 4/2006 | Bixler |
| 2006/0107231 A1* | 5/2006 | Matthews et al. ............. 715/788 |
| 2006/0190833 A1 | 8/2006 | SanGiovanni et al. |
| 2008/0168382 A1* | 7/2008 | Louch et al. ............. 715/781 |
| 2008/0192056 A1 | 8/2008 | Robertson |
| 2009/0322760 A1 | 12/2009 | Kwiatkowski |
| 2011/0225547 A1 | 9/2011 | Fong et al. |

OTHER PUBLICATIONS

Keränen, "Open GL-based User Interface Toolkit for Symbian Mobile Devices," Master of Science Thesis, Apr. 2005, 88 pages.

"You've Got Mail 1.4 build," Jun. 2007, 2 pages.

\* cited by examiner

CONTROL OF TIMING FOR ANIMATIONS IN DYNAMIC ICONS

CROSS REFERENCE TO RELATED APPLICATIONS

This is a continuation of U.S. patent application Ser. No. 12/721,422, filed on Mar. 10, 2010, which is incorporated herein by reference.

TECHNICAL FIELD

The present application relates to user interfaces, and, particularly to user interfaces with dynamic icons.

BACKGROUND

A computer system's user interface allows a user to input commands and data, and to receive the results of operations performed within the computer. In the area of computing devices (e.g., desktops, laptops, mobile phones, PDAs, etc.), the graphical user interface (GUI) has become ubiquitous. The most popular GUI is based upon a metaphor that emulates the desktop environment. The so-called "desktop" is the first screen that appears after a booting process. The desktop represents a base screen, which cannot be further minimized, and is displayed when no other user applications are running or when all other applications are minimized. The desktop generally has user interface elements called "icons" displayed thereon. An icon is an image that represents a particular object that can be manipulated by the user. For instance, an icon may represent a file containing data or a program. An icon can also be employed to represent a window that has been closed or minimized, container objects such as folders, and computer resources, such as disk drives and printers. Selecting an icon generally initiates an application and opens a window associated with the application, which enables the user to access or input information into the application represented by that icon.

Icons are generally static and do not change based on the state of information. For example, traditional desktop icons include an image associated with a file type or application and text showing the name of the file or application. Most desktop icons do not have any animations associated therewith. Some minimal information can be added to the icon to show a new message came in or new email received, but no consideration is given to the timing in which the updates are animated so as to enhance their visibility.

SUMMARY

Dynamic icons are described that can employ animations, such as visual effects, audio, and other content that change with time. If multiple animations are scheduled to occur simultaneously, the timing of the animations can be controlled so as to maximize the visual presentation to the user. For example, the starting time of the animations can be staggered so that the user does not receive multiple animations initiated too close in time. It has been found that too much motion in the user interface can be distracting and cause confusion amongst users.

In one embodiment, content (e.g., text or image data) is received to be displayed in first and second dynamic icons in an animated fashion. Example animations include any moving elements displayed in association with a dynamic icon, such text or images scrolling into view, the icon flipping to display the new content, new content coming into focus while old content fades away, etc. The animations can be based on the content received. For example, text can be displayed by scrolling into view, while images can be faded in or out. Alternatively, the animations can change based on the target icon. Still another option is to have an animation manager decide the type of animation for each icon. One example is that the animation manager can look at the last animation displayed on the user interface and select a different animation to reduce repetitiveness and increase user interest. In another example, in order to maximize the visual effect on the user, the animations can be controlled so that the starting times of the animations are staggered.

In another embodiment, a state machine is used in an animation manager to ensure the visual effect of the animations maximizes the user experience. For example, the animation manager can ensure that the timelines of the animations differ by making them longer or shorter.

In another embodiment, relative distance between the dynamic icons is used to adjust the timing of the animations.

These features and others of the described embodiments will be more readily apparent from the following detailed description, which proceeds with reference to the accompanying drawings.

DETAILED DESCRIPTION

Figure 1:
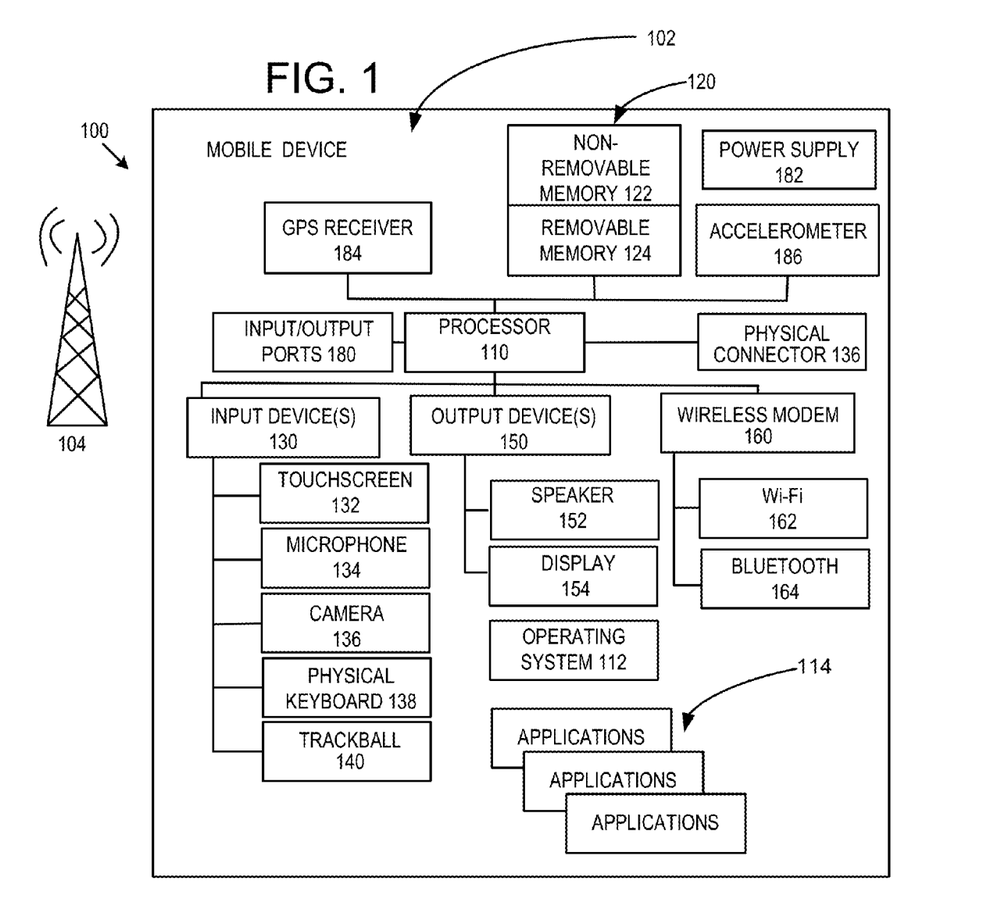
FIG. 1 is an embodiment of a mobile device that can be used in the dynamic display of icons.

FIG. 1 is an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, handheld computer, Personal Digital Assistant (PDA), etc.) and can allow wireless two-way communications with one or more mobile communications networks 104, such as a cellular or satellite network. The illustrated mobile device can include a controller or processor 110 (e.g., signal processor, microprocessor, ASIC, or other control and processing logic circuitry) for performing such tasks as signal coding, data processing, input/output processing, power control, and/or other functions necessary for implementing the mobile device. An operating system 112 can control the allocation and usage of the components 102 and support for one or more application programs 114. The application programs typically include email applications, calendars, contact managers, web browsers, text and media messaging applications. Memory 120 can include non-removable memory 122 and/or removable memory 124. The non-removable memory 122 can include RAM, ROM, flash memory, a hard disk, or other well-known memory storage technologies and can be used for storing data and/or code for running the operating system 112 and the applications 114. Example data can include web pages, text, images, sound files, video data, or other data sets to and from one or more network servers or other mobile devices via one or more wired or wireless networks. The removable memory 124 can include flash memory or a Subscriber Identity Module (SIM) card, which is well known in GSM communication systems, or other well-known memory storage technologies, such as "smart cards." The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device can support one or more input devices 130, such as a touch screen 132, microphone 134, camera 136, physical keyboard 138 and/or trackball 140 and one or more output devices 150, such as a speaker 152 and a display 154. Other possible output devices (not shown) can include piezoelectric or other haptic output devices. A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth or Wi-Fi). The wireless modem 160 is typically configured for communication with one or more cellular networks, such as a GSM network for data and voice communications within a single cellular network, between cellular networks, or between the mobile device and a public switched telephone network (PSSTN). The mobile device can further include at least one input/output port 180, a power supply 182, a satellite navigation system receiver 184, such as a Global Positioning System (GPS) receiver, an accelerometer 186, a transceiver 188 (for wirelessly transmitting analog or digital signals) and/or a physical connector 190, which can be a USB port, IEEE 1394 (firewall) port, and RS-232 port. The illustrated components 102 are not required or all-inclusive, as any components can deleted and other components can be added.

Figure 2:
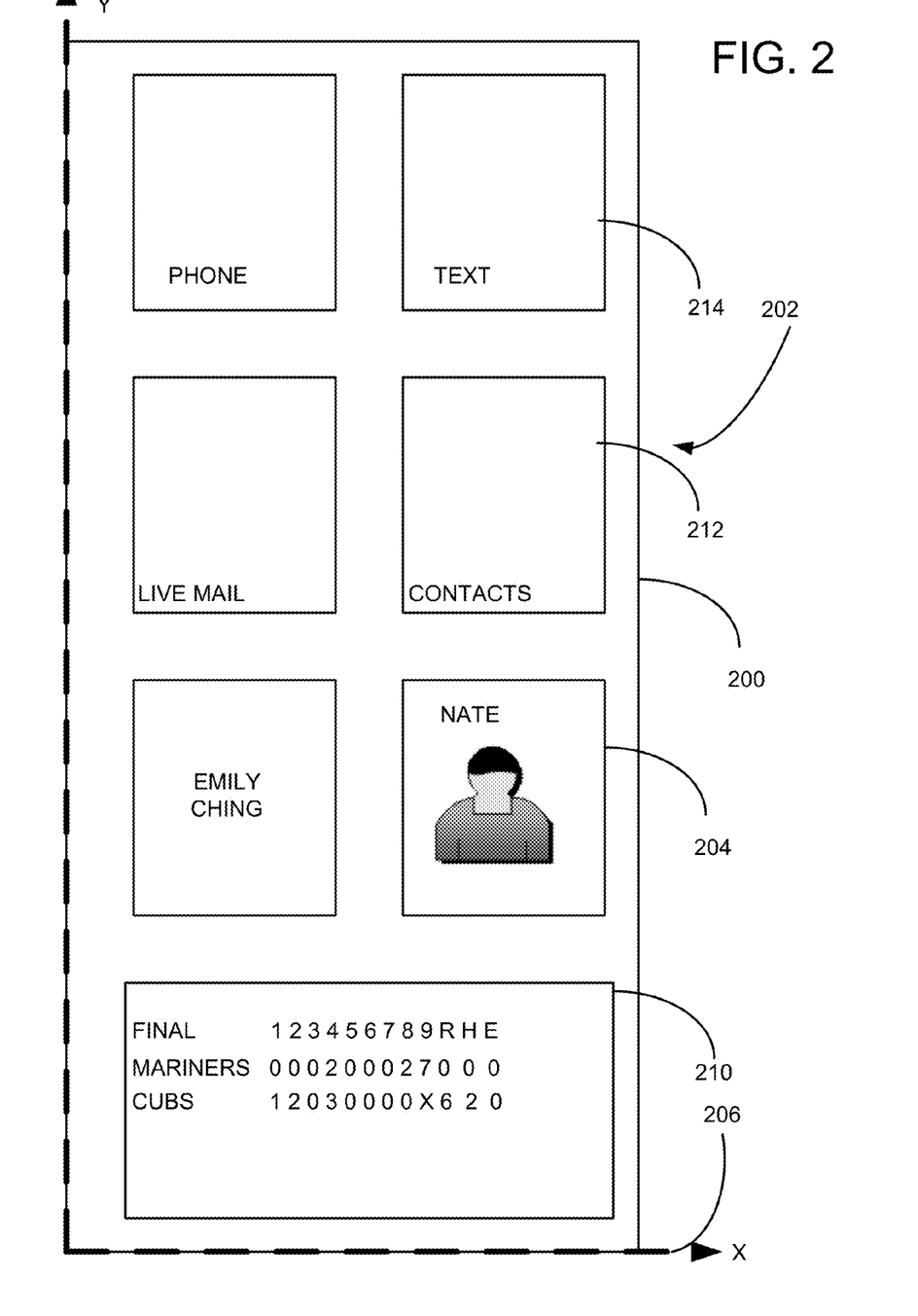
FIG. 2 is an example user interface display with dynamic icons in a first state.

FIG. 2 is an example user interface 200 with a touch screen that can be used in conjunction with the mobile device 100. User interface elements 202 are generically shown as dynamic icons that can display animations. An animation is defined as any moving text or images, such as scrolling text, photos, geometric objects (e.g., colored squares) that occur within the boundaries of the icon. Still further, animation can occur by changing the characteristics of an icon without movement, such as opacity. Typically, the animation occurs within the dynamic icon and an outer boundary of the icon remains fixed or static. Alternatively, the entire dynamic icon can flip or rotate and the new content appears once the flipping or rotational action is complete. Dynamic icon 204 is currently displaying a photo and text (i.e., the word "Nate") in a static mode, but can change to an animation mode wherein an animation is displayed. Each of the user interface elements 202 is positioned on the user interface 200 according to X-Y coordinates defined by the X-Y axes shown at 206. The user interface elements 202 can take a variety of forms and sizes. For example, dynamic icon 210 shows updated sports scores, while other icons relate to contacts (icon 212), text messages (icon 214), etc. The user interface elements 202 can be virtually any size and shape as desired for the particular application.

Figure 3:
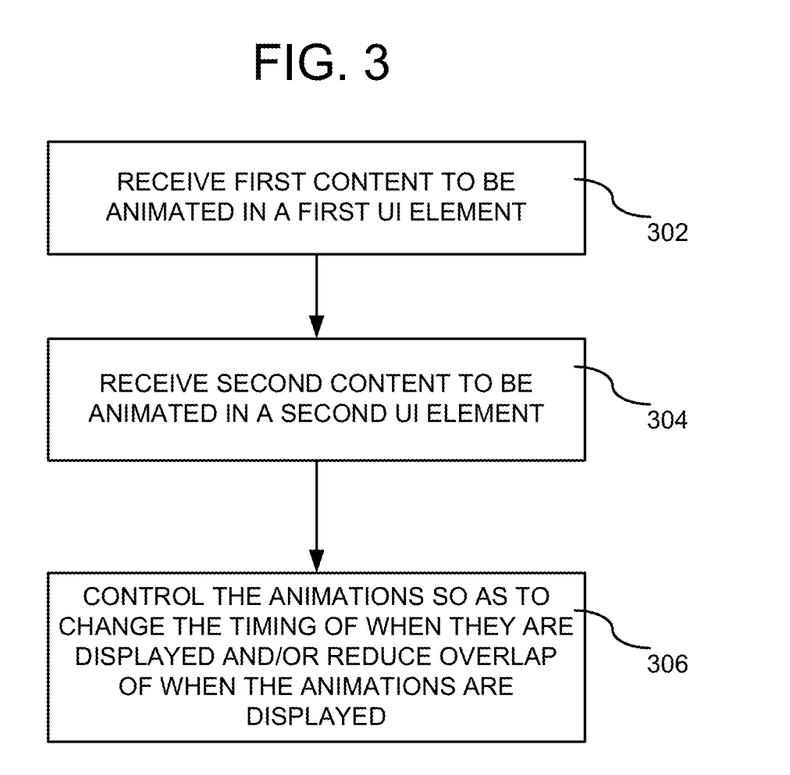
FIG. 3 is a flowchart of a method for displaying animations in dynamic icons with reduced visual overlap between different animations.

FIG. 3 is a flowchart of a method for displaying the animations. In process block 302, first content is received to be animated in a first user interface element. In process block 304, second content is received to be animated in the second user interface element. The first and second content are received close enough in time that both animations could be played simultaneously and overlap to an extent that it would be distracting to users. In such a case, in process block 306, the timing of the animations can be controlled so as to reduce overlap of when the animations are displayed. For example, the start times of the animations can be staggered so as to reduce overlap. An additional process block can be added to check whether a difference in time overlap of the animations is below a predetermined threshold. If yes, then no control is needed. If the time overlap exceeds the threshold, then timing control is implemented to reduce overlap.

Figure 4:
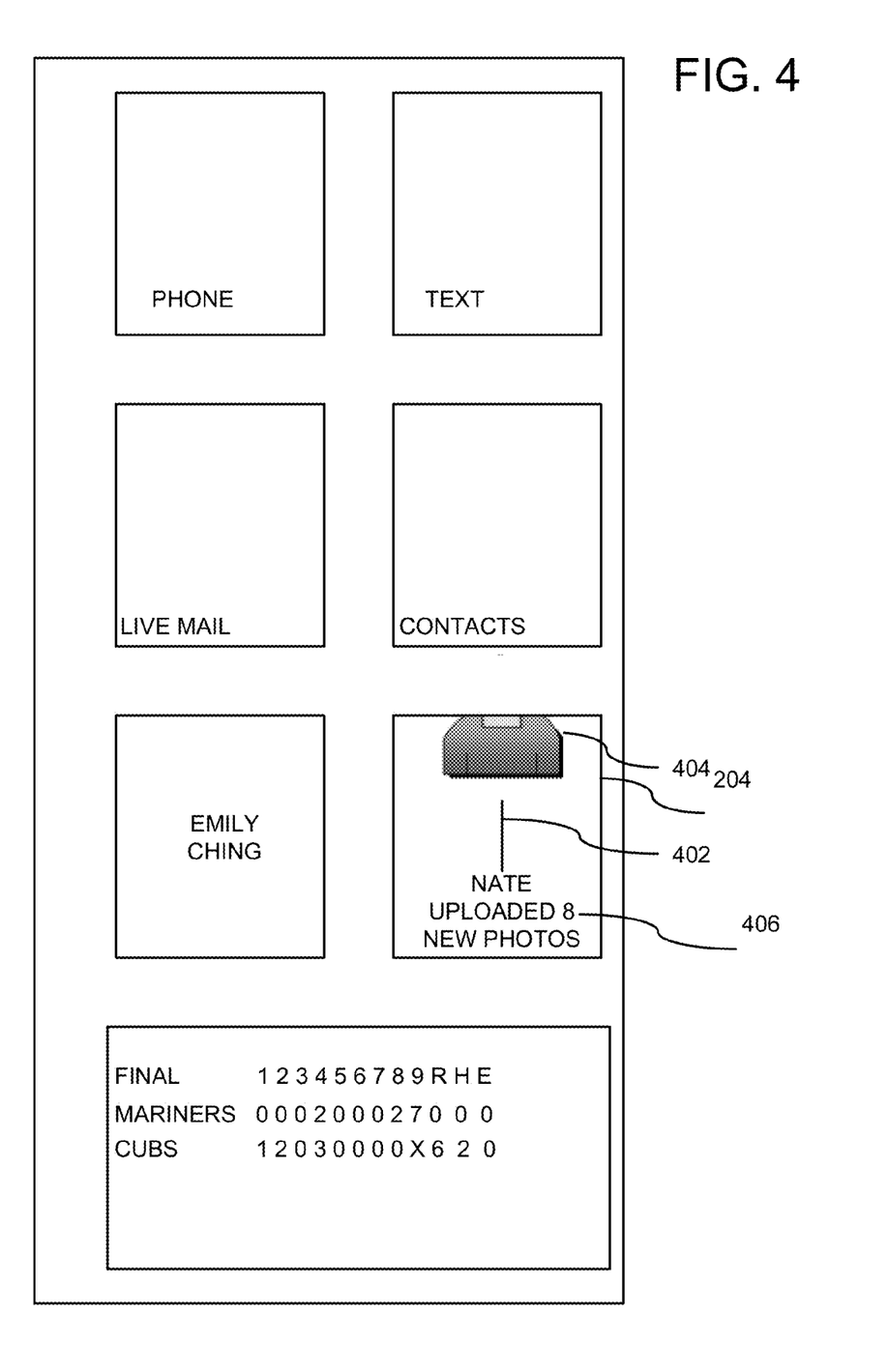
FIG. 4 is an example display of dynamic icons is a second state, with a dynamic icon actively changing from displaying an image to displaying text.

FIG. 4 illustrates an embodiment wherein an animation is occurring. Comparing FIG. 2 to FIG. 4, it is evident that content within the dynamic icon 204 is scrolling in a direction shown by arrow 402 so that image 404 is scrolling out of the icon and new text 406 is scrolling into the dynamic icon. In this example, even though other dynamic animations are ready to be displayed in other icons, the timing is controlled so that no other animations begin until the current animation in dynamic icon 204 is completed.

Figure 5:
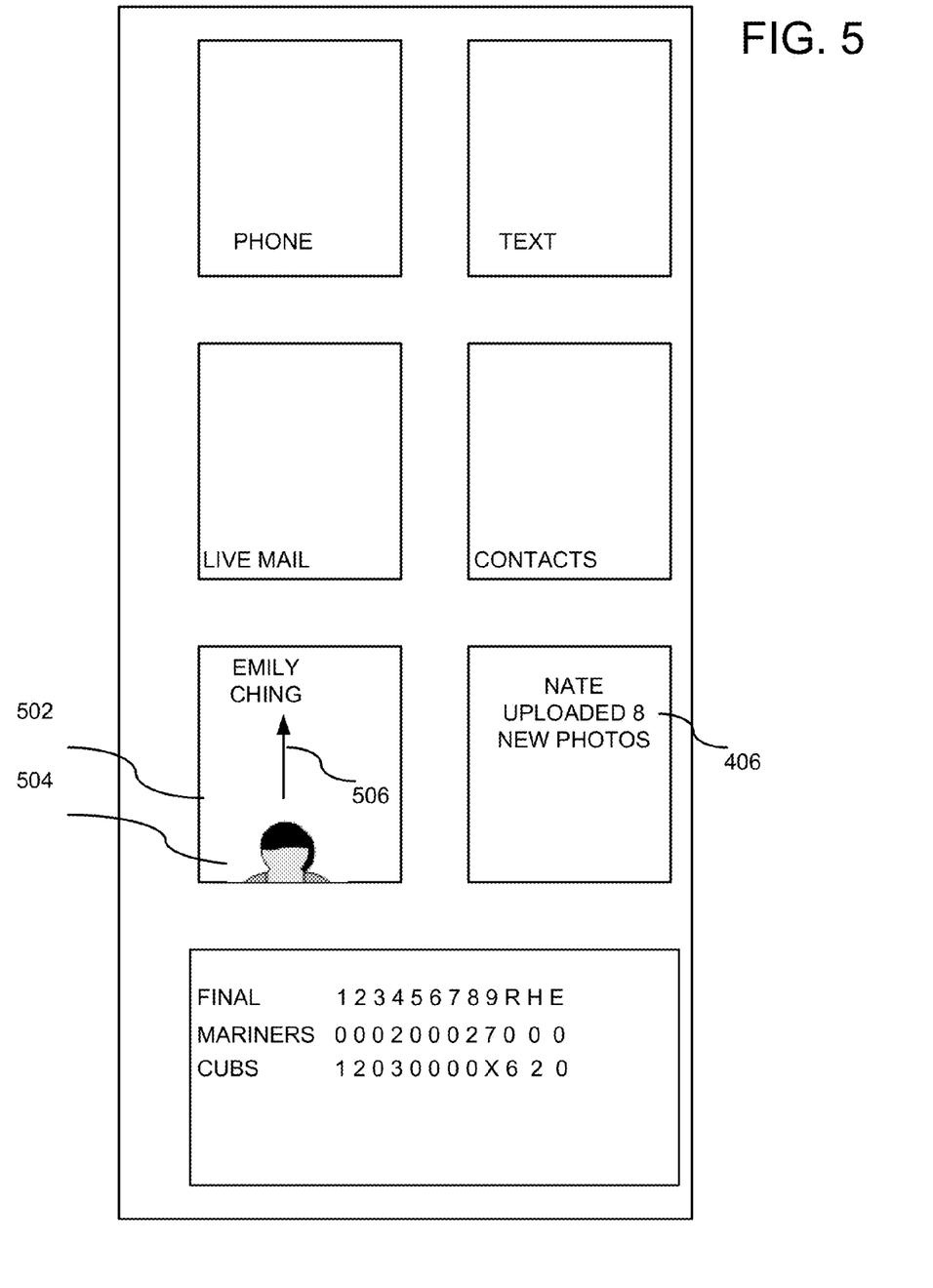
FIG. 5 illustrates another dynamic icon changing state, with a dynamic icon actively scrolling an image into view.

FIG. 5 illustrates a next transition that can occur after icon 204 (FIG. 4) has been updated so that the text 406 has finished scrolling and is in a static (non-animated) state. After text 406 has settled, dynamic icon 502 begins its animation by scrolling an image 504 of "Emily Ching" into the dynamic icon in the direction of arrow 506 to show that a new image of Emily was received. Although the embodiments shown in FIGS. 4 and 5 have no overlap in time in terms of animation, such a rigid approach is not needed. Some overlap is also acceptable. Nonetheless, it is desirable that the timing of the animations is controlled so as to minimize overlap (i.e., being displayed simultaneously) so the user is not overwhelmed. For example, the timeline of the animations can be randomized so that one of the animations is made longer or shorter.

Figure 6:
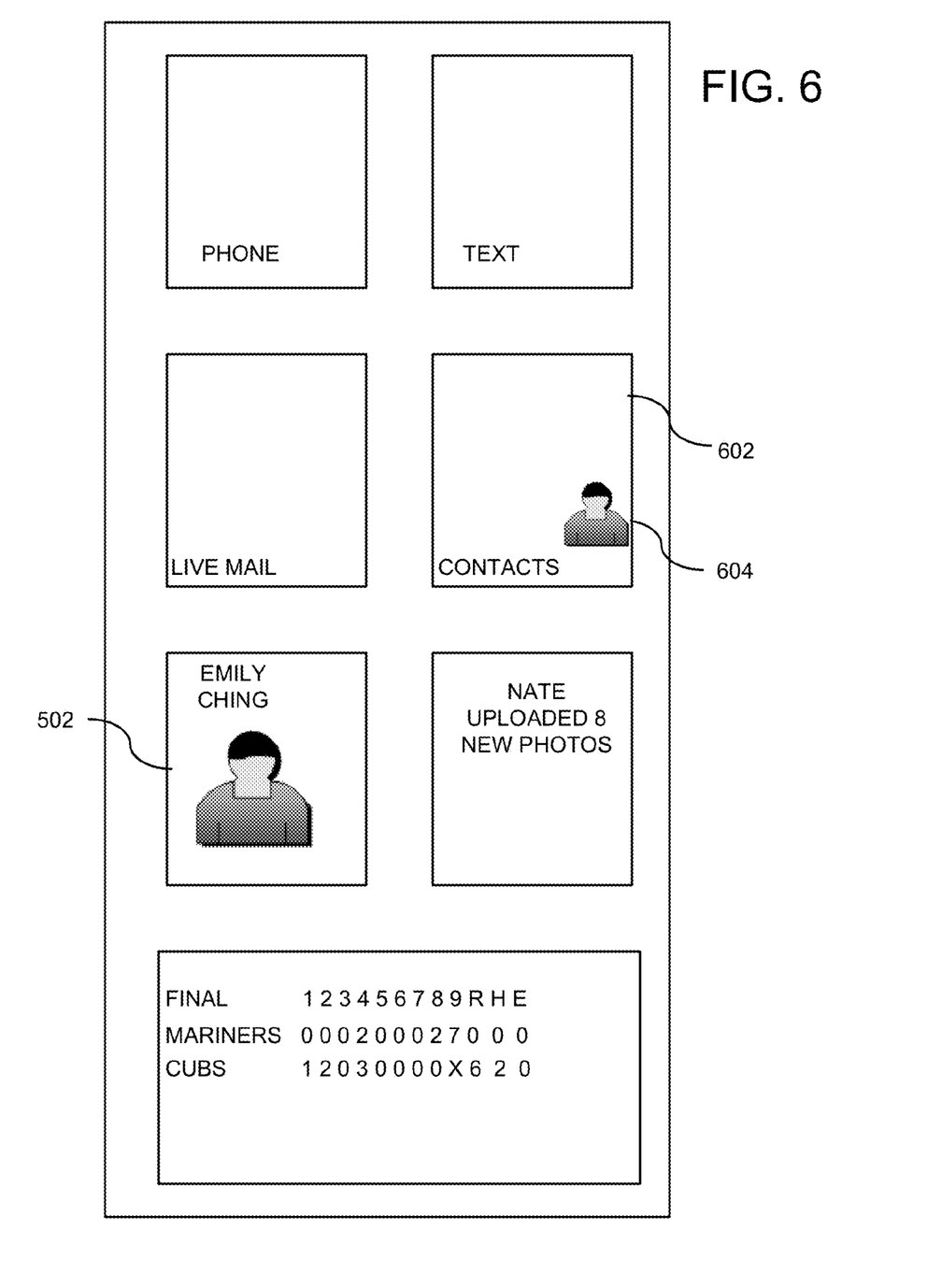
FIG. 6 illustrates another dynamic icon changing state, with a dynamic icon actively displaying an image by fading the image into view.

FIG. 6 illustrates another transition where once dynamic icon 502 has finished its animation, dynamic icon 602 performs an animation by fading in the picture of Emily Ching 604 to illustrate that the "Contact" database has been updated.

Figure 7:
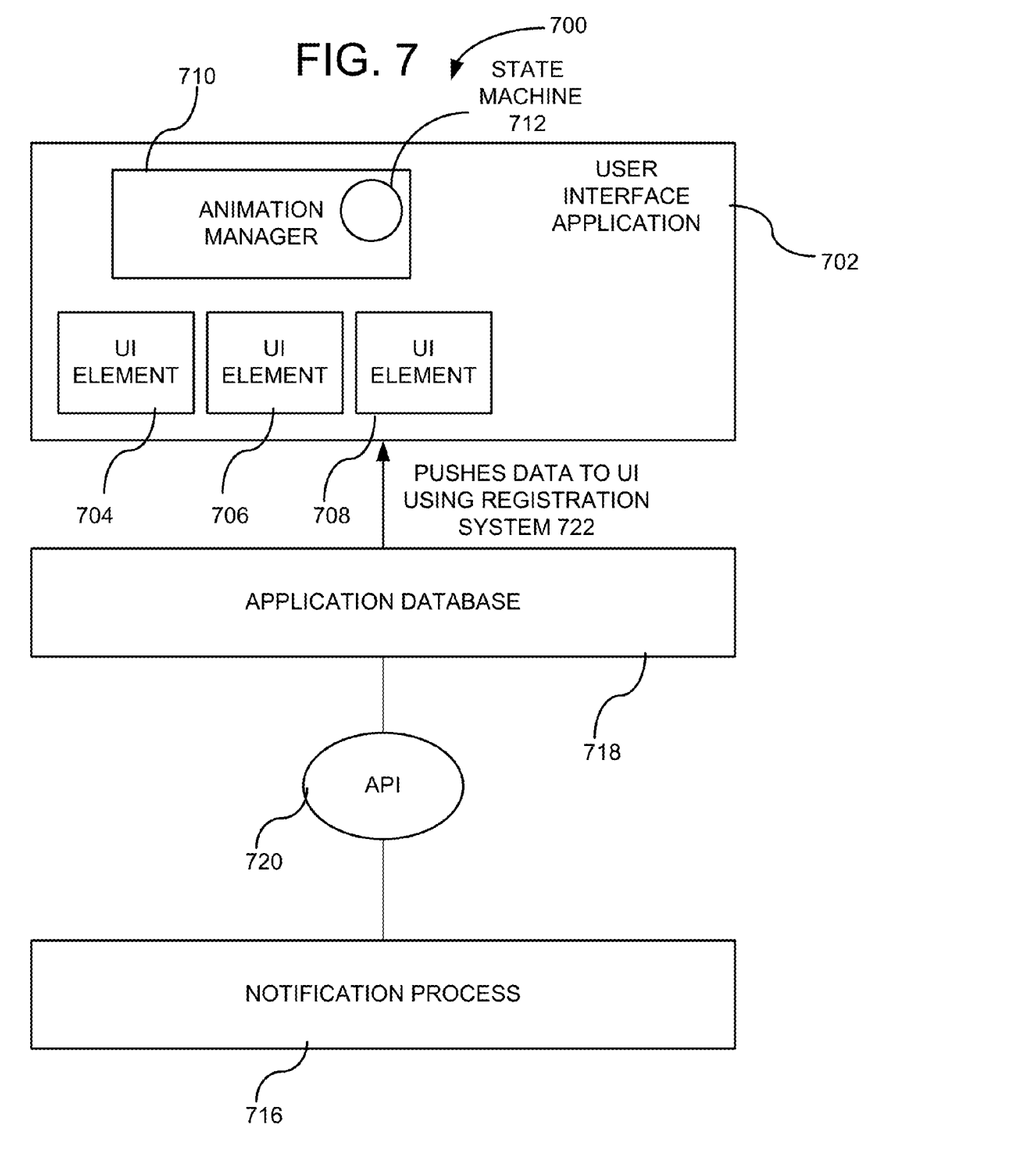
FIG. 7 illustrates an overall structure of the system with an animation manager controlling various dynamic icons, shown as UI elements.

FIG. 7 is an embodiment of an architecture 700 that can be used to implement the dynamic animations. A user interface application 702 is used to display multiple user interface elements 704, 706, 708, which can be dynamic icons. An animation manager 710 can use a state machine 712 to control the timing of the dynamic animations. New content to be displayed in the user interface elements is received from a notification process 716, which updates an application database 718 via an API 720. The content from the application database 718 is pushed to the user interface application 702 using a registration system, as shown at 722. As further described below, the user interface elements receive a notification that content is to be displayed and make a request to the animation manager 710, which controls (e.g., decides how and when) the animation of the content on the user interface elements 704, 706, 708.

Figure 8:
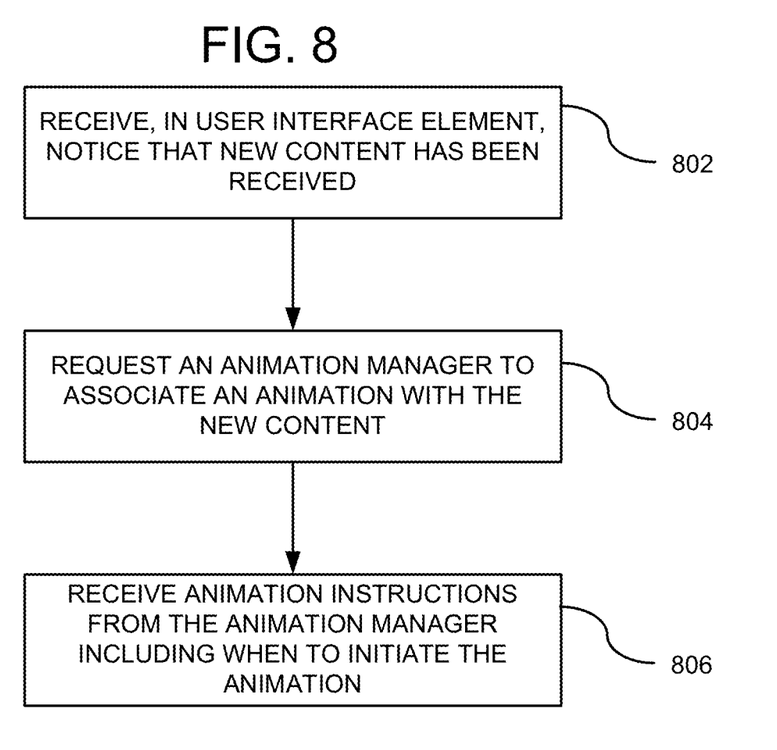
FIG. 8 is a flowchart of a method for animating dynamic icons using an animation manager.

FIG. 8 is a flowchart of a method for animating content from the perspective of a user interface element. In process block 802, a user interface element receives notice that new content has been received. For example, returning to FIG. 7, one of the user interface elements 704, 706, 708 can receive notice through the registration system 722. In process block 804, a request is made to an animation manager. The animation manager then makes a decision as to how to animate the particular content on each user interface element that made the request and when to animate the content on each user interface element. In particular, the animation manager controls the timing of the animations to reduce timing overlap. In process block 806, the user interface elements that made the request receive instructions from the animation manager as to when and how to initiate the animation. For example, a start time can be passed to the user interface element. Additionally, the animation type (e.g., scrolling, fade in, etc.) can be passed to the user interface element so that the user interface element is directed how to display the content.

Figure 9:
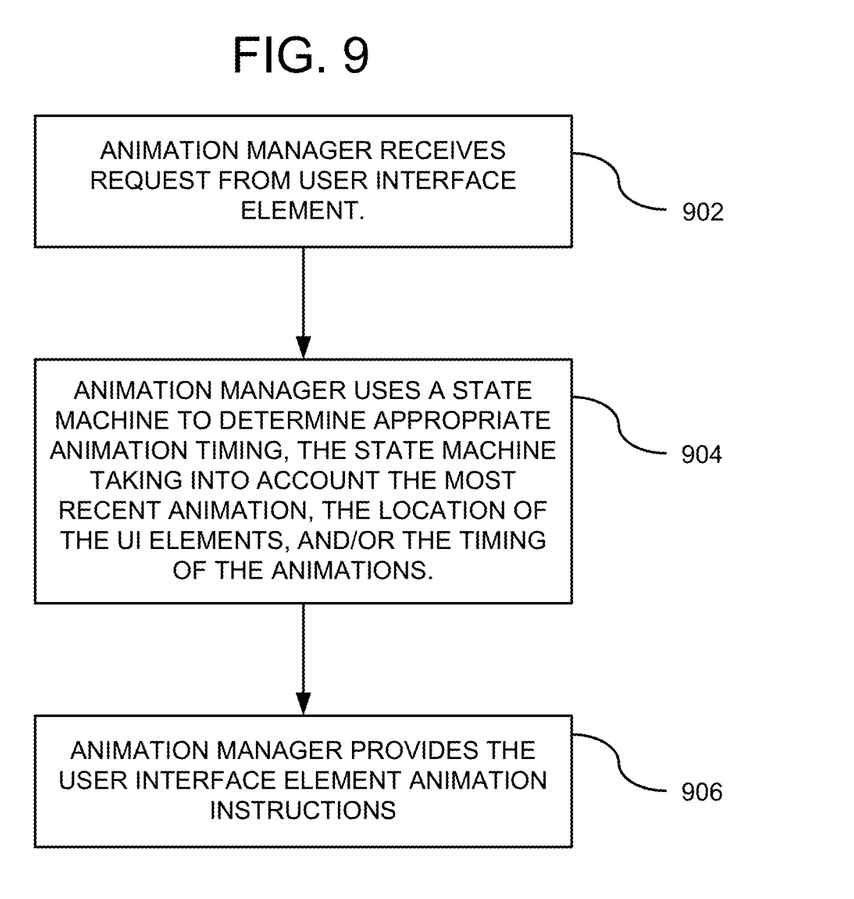
FIG. 9 is a flowchart of a method for using a state machine in an animation manager to update dynamic icons.

FIG. 9 shows a flowchart of a method for animating content from the perspective of the animation manager. In process block 902, the animation manager receives a request from the user interface element that new content is to be displayed. In process block 904, the animation manager uses a state machine to determine the appropriate animation timing for each user interface element. Additionally, the animation manager can also decide on the animation to associate with the content. The state machine can take into account the most recent animation that was started, the location of the user interface elements being animated, and the timing of the animations. For example, if the state machine determines that another animation is still in progress, the animation manager can determine the relative location of the animation in progress (XY coordinates of the dynamic icon) and the location of the dynamic icon for the new request for an animation. The further apart the user interface elements, the more time overlap can occur between the elements. Conversely, the closer the elements, the less overlap should occur with the animations. Additionally, the duration and speed of the animations can be taken into account. For example, a slow animation on one user interface element can overlap with a faster animation on another user interface element, without being overwhelming to a user. Additionally, the latest animation that was displayed can be determined and can be used to select the next animation. For example, if scrolling was used to animate one dynamic icon, then the next animation can be a fade in so as to maximize the visual experience for the user. Overall, the closer the together the icons, the greater the visual difference (e.g., starting time, duration, animation type, etc.) should be between the icons. In process block 906, the animation manager provides the user interface element the animation instructions, including timing information (e.g., when to start, duration, etc.).

Figure 10A:
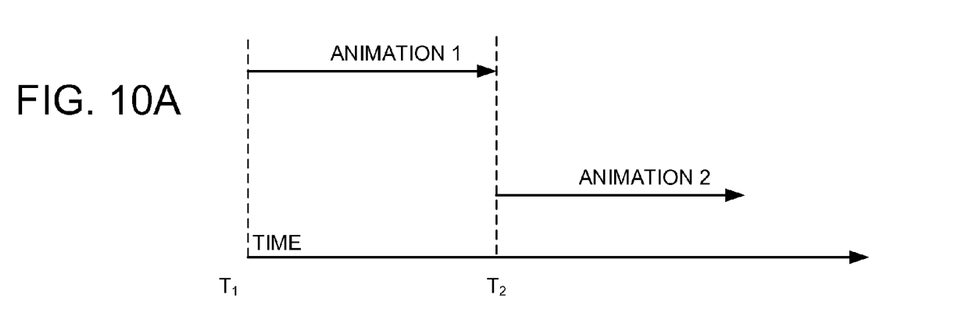
FIGS. 10A-10C illustrate various control of timing of the animations in order to ensure visual spacing between the animations is sufficient.
Figure 10B:
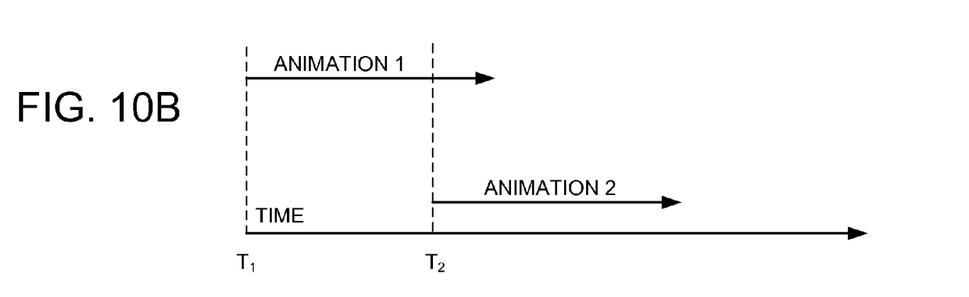
Figure 10C:
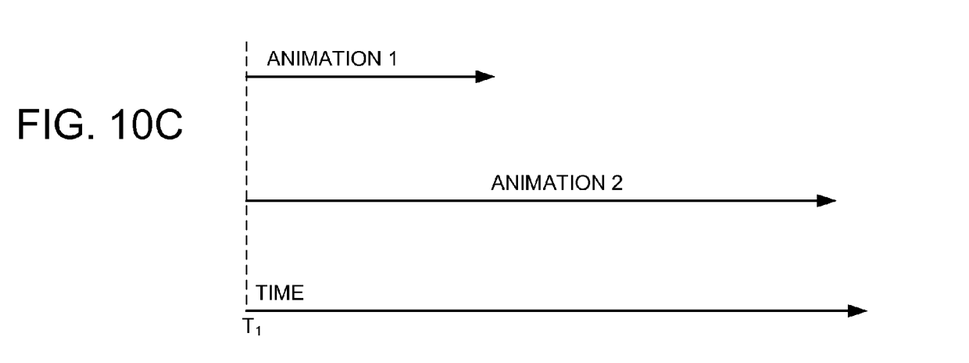

FIGS. 10A-10C show example timing that can be used for the animations of the dynamic icons. In FIG. 10A, a first animation is started at time $t_1$ and a second animation is started at time $t_2$, after the first animation is complete. FIG. 10B shows a slight overlap between the first animation and the second animation, wherein the first animation continues for a time after the second animation begins. The difference between $t_1$ and $t_2$ is a staggered time between the animations. FIG. 10C shows that the animations can have a same start time $t_1$, but a timeline for the second animation is slowed considerably to make the overall animation more than twice as long as the first animation. Thus, the timeline for the animation can be selected in order to ensure differing durations. The timeline can either be randomly selected or predetermined times can be used for duration.

Figure 11:
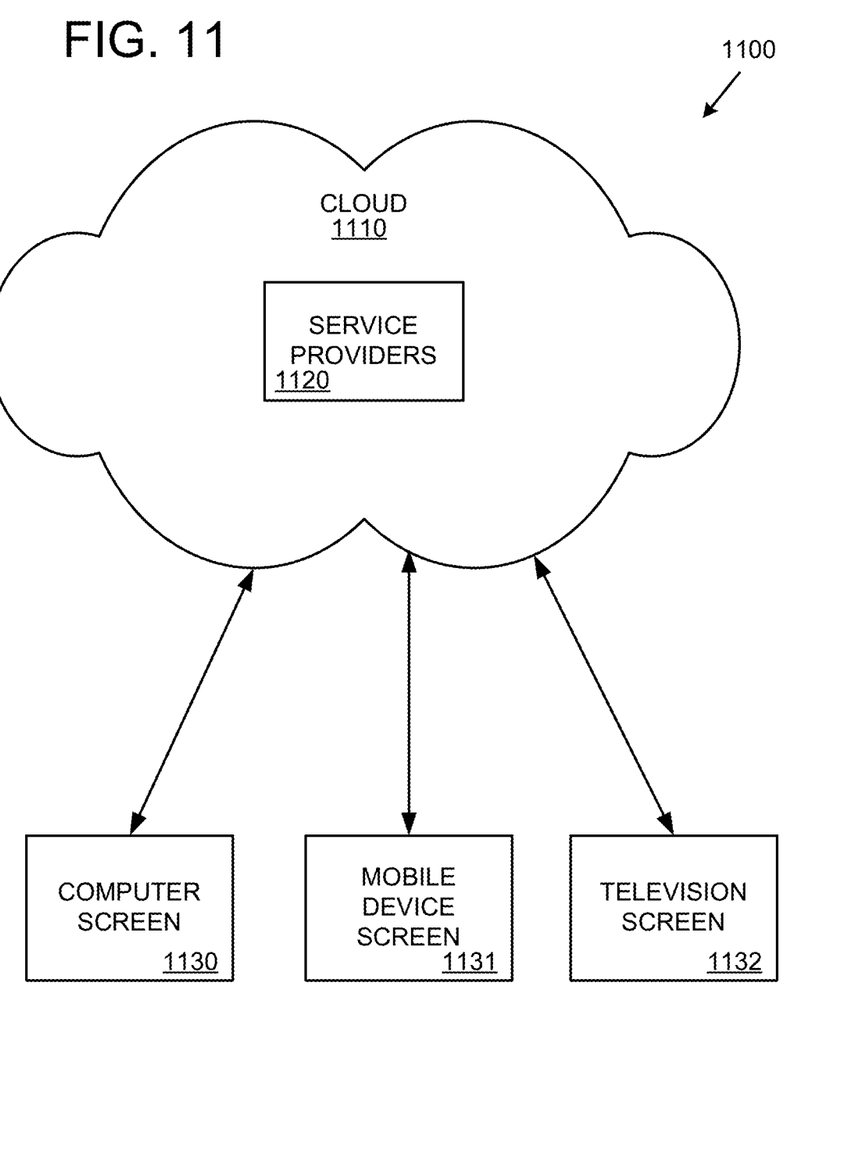
FIG. 11 shows an environment in which any of the devices can be used with the dynamic icons described herein.

FIG. 11 illustrates a generalized example of a suitable implementation environment 1100 in which described embodiments, techniques, and technologies may be implemented.

In example environment 1100, various types of services (e.g., computing services) are provided by a cloud 1110. For example, the cloud 1110 can comprise a collection of computing devices, which may be located centrally or distributed, that provide cloud-based services to various types of users and devices connected via a network such as the Internet.

In example environment 1100, the cloud 1110 provides services for connected devices 1130-1132 with a variety of screen capabilities. Connected device 1130 represents a device with a computer screen (e.g., a mid-size screen). For example, connected device 1130 could be a personal computer such as desktop computer, laptop, notebook, netbook, or the like. Connected device 1131 represents a device with a mobile device screen (e.g., a small size screen). For example, connected device 1131 could be a mobile phone, smart phone, personal digital assistant, tablet computer, and the like. Connected device 1132 represents a device with a large screen. For example, connected device 1132 could be a television screen (e.g., a smart television) or another device connected to a television (e.g., a set-top box or gaming console) or the like. One or more of the connected devices 1130-1132 can include touch screen capabilities.

Services can be provided by the cloud 1110 through service providers 1120, or through other providers of online services (not depicted). For example, cloud services can be customized to the screen size, display capability, and/or touch screen capability of a particular connected device (e.g., connected devices 1130-1132).

In example environment 1100, the cloud 1110 provides the technologies and solutions described herein to the various connected devices 1130-1132 using, at least in part, the service providers 1120. For example, the service providers 1120 can provide a centralized solution for various cloud-based services (e.g., spelling data, grammar data, word frequency data, etc.). The service providers 1120 can manage service subscriptions for users and/or devices (e.g., for the connected devices 1130-1132 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

We claim:

1. A method for displaying dynamic icons in a graphical user interface of a computing device, comprising:
   receiving first content to be animated in a first dynamic icon;
   starting animation of the first content in the first dynamic icon;
   receiving second content to be animated in a second dynamic icon;
   checking whether a difference in time overlap of the animations of the first content in the first dynamic icon and the second content in the second dynamic icon is below a predetermined threshold;
   if the difference in time overlap exceeds the predetermined threshold, controlling timing of the animation of the second content in the second dynamic icon so as to reduce the time overlap; and
   at a time different from a starting time of the animation of the first content in the first dynamic icon and in response to the controlling timing of the animation of the second content in the second dynamic icon, starting animation of the second content in the second dynamic icon.

2. The method of claim 1, further comprising associating the first and second contents with animations to be displayed in the respective first and second dynamic icons.

3. The method of claim 1, wherein the controlling of timing is performed in an animation manager that uses a state machine to ensure a staggered starting time of the animations.

4. The method of claim 1, further comprising randomizing timelines of the animations to randomly make the animations longer or shorter.

5. The method of claim 1, wherein the controlling of timing comprises determining positions of the first and second dynamic icons and adjusting the timing of the animations based on the positions.

6. The method of claim 5, wherein determining positions comprises receiving XY coordinates for the first and second dynamic icons, calculating a distance between the first and second dynamic icons, and increasing a visual difference in the animations the closer together the first and second dynamic icons are positioned.

7. The method of claim 1, further comprising using a most recent animation displayed in determining a next animation to display.

8. The method of claim 1, wherein the animations include displaying a photo in the dynamic icon.

9. The method of claim 1, wherein the first and second dynamic icons are displayed on a mobile phone.

10. The method of claim 1, wherein in response to receiving the first and second contents, requesting an animation manager how to display the contents.

11. An apparatus for displaying dynamic icons in a graphical user interface of a computing device, comprising:
    multiple user interface elements capable of animating content; and
    an animation manager coupled to the multiple user interface elements, the animation manager including a state machine so as to stagger a starting time of when animations are displayed in the user interface elements;
    wherein the animation manager uses the state machine to perform a method comprising:
    receiving first content to be animated in a first user interface element;
    starting animation of the first content in the first user interface element;
    receiving second content to be animated in a second user interface element;
    checking whether a difference in time overlap of the animations of the first content in the first user interface element and the second content in the second user interface element is below a predetermined threshold;
    if the difference in time overlap exceeds the predetermined threshold, controlling timing of the animation of the second content in the second user interface element so as to reduce the time overlap; and
    at a time different from a starting time of the animation of the first content and in response to the controlling timing of the animation of the second content, starting animation of the second content in the second user interface element.

12. The apparatus of claim 11, further comprising an application database that is used to push the contents to the user interface elements.

13. The apparatus of claim 11, wherein the user interface elements are dynamic icons.

14. The apparatus of claim 11, wherein the apparatus is a mobile phone.

15. The apparatus of claim 11, wherein the state machine is configured to randomize timelines of the animations to randomly make the animations longer or shorter.

16. The apparatus of claim 11, wherein the state machine is configured to determine positions of the first and second user interface elements and adjust the timing of the animations based on the positions.

17. A computer-readable medium, which is nonvolatile storage, having instructions encoded thereon which, when executed by a computing device, cause the computing device to perform a method comprising:

receiving first content to be animated in a first dynamic icon;

starting animation of the first content in the first dynamic icon;

receiving second content to be animated in a second dynamic icon;

checking whether a difference in time overlap of the animations of the first content in the first dynamic icon and the second content in the second dynamic icon is below a predetermined threshold;

if the difference in time overlap exceeds the predetermined threshold, controlling timing of the animation of the second content in the second dynamic icon so as to reduce the time overlap; and at a time different from a starting time of the animation of the first content in the first dynamic icon and in response to the controlling timing of the animation of the second content in the second dynamic icon, starting animation of the second content in the second dynamic icon.

18. The computer-readable medium of claim 17, further comprising randomizing timelines of the animations to randomly make the animations longer or shorter.

19. The computer-readable medium of claim 17, wherein the controlling timing comprises determining positions of the first and second dynamic icons and adjusting the timing of the animations based on the positions.

20. The computer-readable medium of claim 19, wherein the determining positions comprises receiving XY coordinates for the first and second dynamic icons, calculating a distance between the first and second dynamic icons, and increasing a visual difference in the animations the closer together the first and second dynamic icons are positioned.

* * * * *